MAGNETIC MEMORY AND SWITCHING CIRCUIT

Filed April 30, 1957 2 Sheets-Sheet 1

INVENTOR
WALTER LEROY MORGAN II
BY G. D. O'Brien
R. Baxter Warner
ATTORNEYS

July 19, 1960 W. L. MORGAN II 2,946,047

MAGNETIC MEMORY AND SWITCHING CIRCUIT

Filed April 30, 1957 2 Sheets-Sheet 2

INVENTOR
WALTER LEROY MORGAN II

BY

ATTORNEYS

United States Patent Office
2,946,047
Patented July 19, 1960

2,946,047

MAGNETIC MEMORY AND SWITCHING CIRCUIT

Walter Leroy Morgan II, Maple Shade, N.J., assignor, by mesne assignments, to the United States of America as represented by the Secretary of the Navy Filed Apr. 30, 1957, Ser. No. 656,173

3 Claims. (Cl. 340—174)

This invention relates to magnetic circuits for performing switching and storing operations, such as those used in information handling systems. More specifically, it relates to a method of and means for advancing information pulses through a magnetic shift register to convert a serial input into a parallel output.

Magnetic switching circuits have been developed that employ magnetic cores made of material having a substantially square hysteresis curve and in which residual flux density is a large fraction of the saturation flux density. It is a characteristic of such circuits that high speed switching operations are not subject to mechanical limitations, an advantage over systems which use relays, rotating drums, magnetic tape, and magnetic wire. Once pulses representative of information have been stored in such circuits no power is needed to preserve the information, an improvement over cathode ray tube, relay, acoustic, and vacuum tube storage systems.

It is an object of this invention to realize the above advantages and improvements in an improved series-parallel shift register using magnetic cores as memory and switching devices.

It is also an object of this invention to provide an improved magnetic series-parallel shift register in which each core is limited in every operation to driving only one of the other cores in the register.

A basic object of this invention is to provide an advantageous way of controlling the transfer of pulsed information through a magnetic shift register to convert serial information input into parallel information output.

The above objects are achieved, in accordance with this invention, by providing a series-parallel shift register in which a plurality of magnetic cores are inductively coupled together in serial arrangement and in which a corresponding number of magnetic cores are inductively coupled each to a corresponding one of the serial arranged cores. Rectifying elements are provided in all of the inductive couplings between cores to provide unidirectional transfer of pulses and biasing means are provided to selectively gate the rectifying elements in a manner such that serial advance and parallel transfer will take place selectively. Since only one type of transfer is carried on at any one time, the gating of the rectifying elements prevents any core from driving more than one other core during transfer of information through the shift register.

Figure 1:
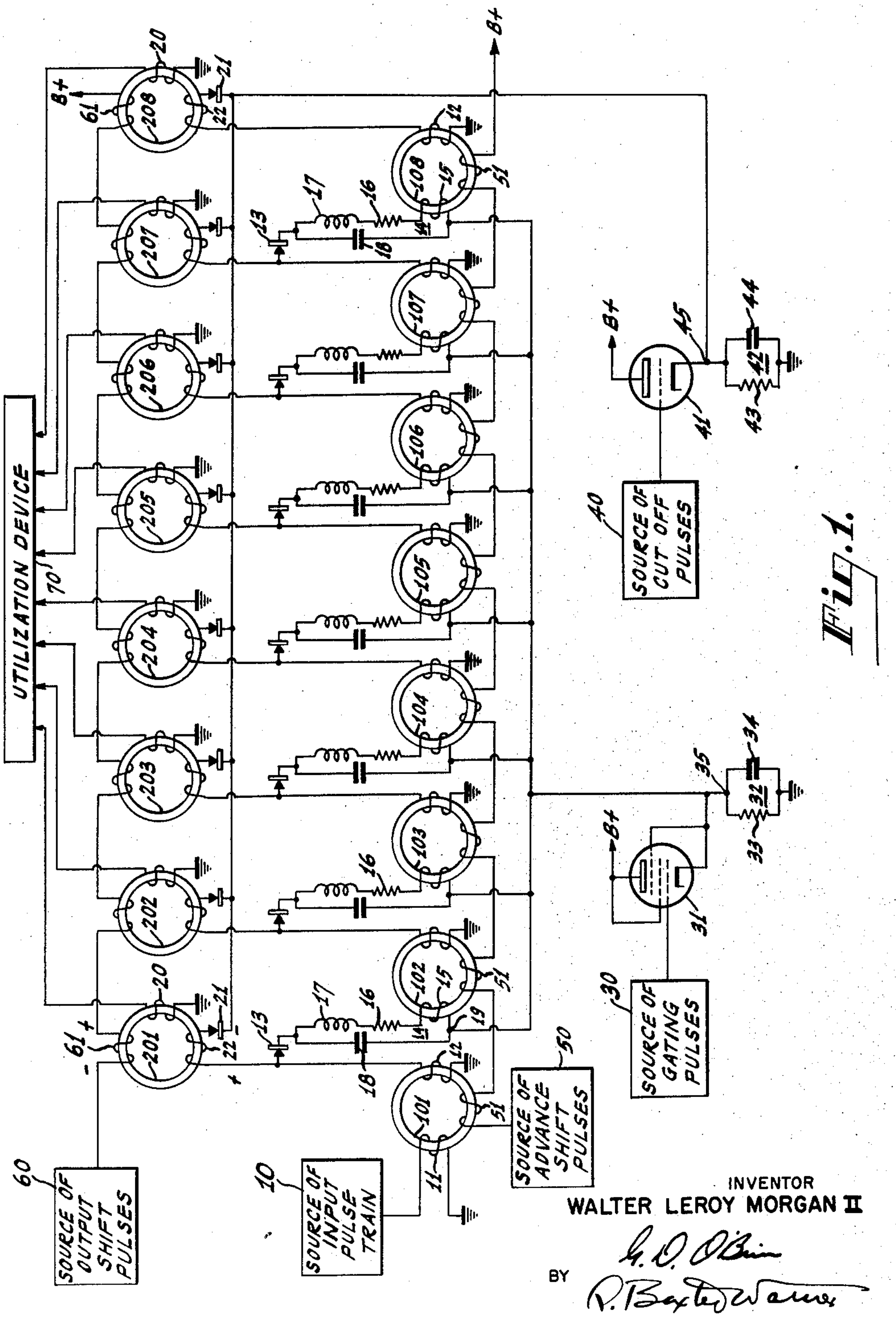
Figure 2:
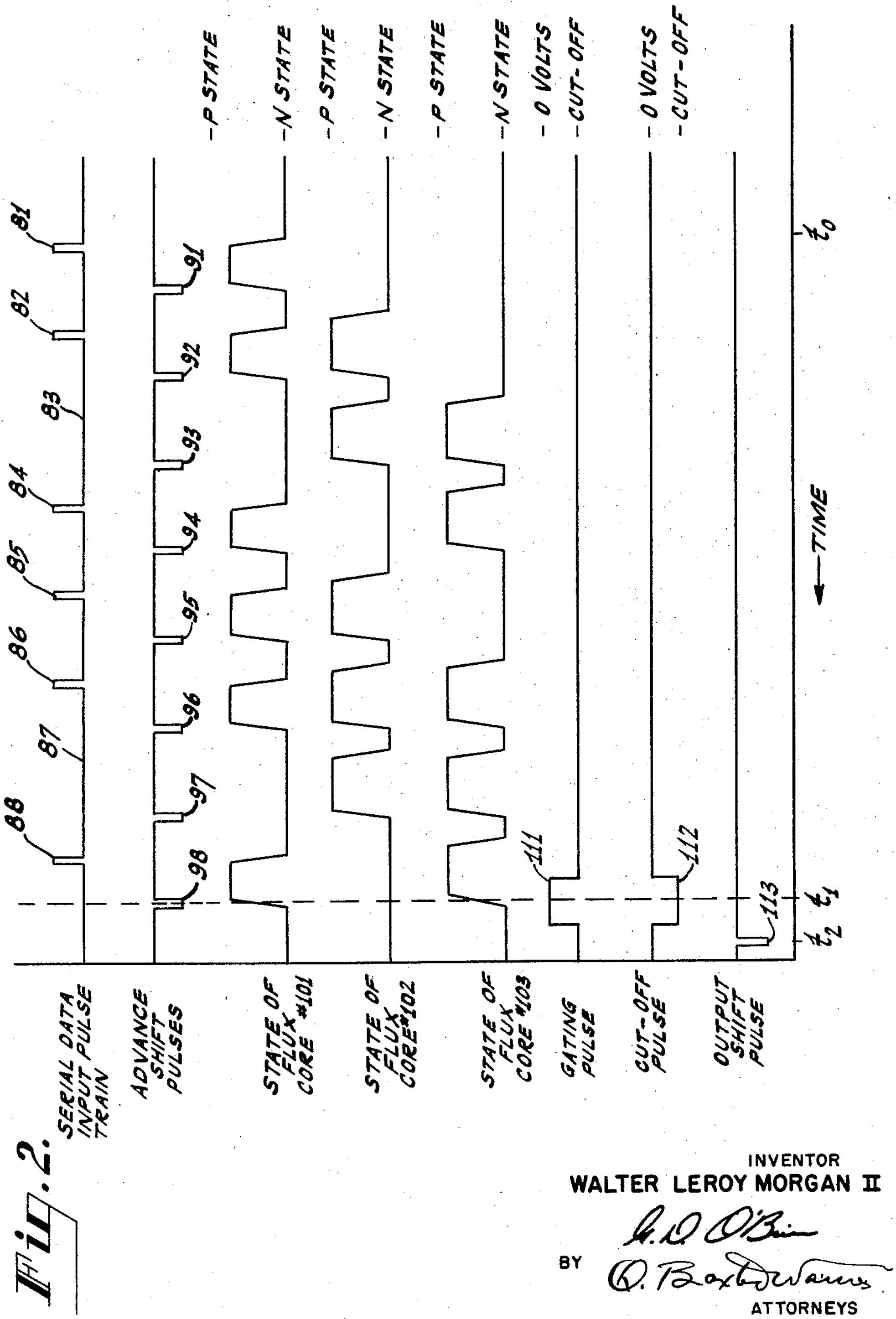

Other objects and many of the attendant advantages of this invention will be readily appreciated as the same becomes better understood by reference to the following detailed description when considered in connection with the accompanying drawings wherein:

Fig. 1 is a schematic representation of a series-parallel shift register in accordance with this invention; and Fig. 2 is a graphic illustration (not to scale) of the time relationship of wave forms and of the changes in magnetic state occurring in the shift register of Fig. 1.

THE SHIFT REGISTER

The shift register, Fig. 1, includes a number of magnetic memory cores 101 to 108 inductively coupled together for serial advance of the data input, and an equal number of similar cores 201 to 208 each inductively coupled to a corresponding one of the serial cores 101 to 108 for parallel transfer of data. It is desirable that each core be made of magnetic material having a residual flux density which is a large fraction (at least .4 but preferably greater than .8) of saturation flux density and that the hysteresis curve have a generally square loop configuration. Data input, in the form of a serial pulse signal train, is applied, from a source 10, to a data input coil 11 on the first serial core 101. Data output, comprising parallel pulses, is derived from output coils 20 on the parallel cores 201 to 208.

The inductive coupling between serial cores 101 to 108 includes, in each case, an output coil 12 on the anterior core, a diode rectifier 13, a pulse delay network 14, and a serial input coil 15 on the posterior core. Semiconductor devices, having high current capacity in one direction only, are well suited for use as the diode rectifiers 13 in the coupling circuits between cores. In each coupling between the serial cores 101 to 108, the diode rectifier 13 is connected in series between the output coil 12 and the delay network 14. Each delay network 14 includes a series combination of an inductor 17, a resistor 16, and the associated serial input winding 15 with a capacitor 18 in parallel with the series combination. This network 14 has a relatively short time constant, preferably in the order of five micro-seconds, so as to produce a delay in the application to the serial input winding 15 of a current pulse induced in the anteceding output winding 12 and passed through the diode rectifier 13. Appropriate values for the components of the delay network 14 may well include five millihenries for the inductor 17, 1,500 ohms for the resistor 16 and 2,000 micromicrofarads for the capacitor 18 where the inductance of the serial input winding is negligible in its influence on the functioning of the delay network 14.

The inductive coupling between each of the serial cores 101 to 108 and a corresponding one of the parallel cores 201 to 208 includes, in each case, a similar diode rectifier 21 connected in series with the output coil 12 on the serial core and a parallel transfer input coil 22 on the parallel core. This diode rectifier 21 has the same characteristics and function as does each of the diode rectifiers 13 in the serial couplings.

Biasing means for the diode rectifiers 13 and 21 include a pair of electron tube circuits, one circuit supplying bias to all serial connected diode rectifiers 13 and the other supplying bias to all parallel connected diode rectifiers 21. The first bias circuit includes an electron tube 31 with a time constant network 32 in its cathode circuit. This tube 31 is of a type which can be gated on by the application of an appropriate gating pulse to the control grid thereof. The time constant network is comprised of a resistor 33 and a capacitor 34 in parallel. Satisfactory performance of such a bias circuit can be obtained by using a 400 ohm resistor 33 and a .01 microfarad capacitor 34 for the time constant network 32 in circuit with a 6AQ5W beam power tube which is gated on by a two millisecond gating pulse applied to its control grid. A connection from a point 35 on the cathode side of the time constant network 32 to a point 19 intermediate the capacitor 18 and the serial input coil 15 of each delay network 14 supplies blocking bias to each of the diode rectifiers 13 in response to the gating on of the tube 31.

The second bias circuit includes a second electron tube 41 with a second time constant network 42 in its cathode circuit. This tube 41 is of a type which can be readily cut off by the application of an appropriate cut-off pulse to the control grid thereof. The time constant network 42 also is comprised of a resistor 43 and a capacitor 44 in parallel. Satisfactory performance of this second bias circuit can be obtained by using a 4000 ohm resistor and a .001 microfarad capacitor in the cathode circuit of one-half of a 5687 twin triode tube having a two millisecond cut-off pulse applied to its control grid. A connection from a point 45 on the cathode side of this second time constant network 42 to the cathode side of each parallel connected diode rectifier 21 supplies blocking bias to each diode rectifier while the second electron tube 41 is conducting and removes the blocking bias therefrom in response to cut-off of the tube 41.

In order to advance and transfer pulses through the shift register, each of the serial cores 101 to 108 has on it an advance shift coil 51. The advance shift coils are all connected to a common source 50 of shift pulse energy. To produce a parallel pulse output each of the parallel cores 201 to 208 has on it an output advancing coil 61. The output advance coils are all connected to a second source 60 of shift pulse energy.

In the foregoing, a shift register including sixteen cores—eight serial and eight parallel—has been described. A shift register, constructed in accordance with this invention, can have any suitable number of cores provided the number of parallel cores equals the number of bits of information to be stored therein at any one time, and provided, also, that the number of serial cores equals or exceeds the number of parallel cores.

*Operation*

In order to condition the shift register for the application thereto of data input, the diode rectifiers 21 associated with the parallel input coils 201 to 208 are biased to cut-off and the diode rectifiers 13 associated with the serial input coils 101 to 108 have the bias removed therefrom so that they may conduct. This bias condition is maintained until such time as it is desired to transfer data from the serial cores 101 to 108 to the the parallel cores 201 to 208. This latter operation will be described later.

In operation a pulse signal train 81 to 88 is applied to the data input coil 11. For convenience the pulse signal train is here considered to consist of eight information bits, the occurrence of a pulse representing a binary one and the absence of a pulse representing a binary zero. When applied to the data input coil 11, the first pulse 81 of the train will cause the first serial core 101 to assume a state of magnetic flux P. For the purposes of this description a state P of flux is designated as a clockwise direction of flux and a state N as a counterclockwise direction of flux. The unidirectional nature of the rectifiers 13 and 21 prevent a change to a P state setting of the first serial core 101 from inducing a signal in the serial input coil 15 on the next serial core 102 and from inducing a signal in the parallel input winding 22 on the first parallel core 201.

To advance the information, represented by a state P of flux in the first serial core 101, an advance shift pulse 91 is applied to the advance shift winding 51 on this core 101. The advance pulse 91 causes the core 101 to revert to an N state of flux, inducing an output pulse in the core's output winding 12. With no bias on the diode rectifier 13 between the first and second serial coils 101 and 102, this serial output pulse is conducted through to the delay network 14. During application of the advance shift pulse 91 to the first serial core 101, the serial output pulse is charging the condenser 18 of the delay network 14. After the advance shift pulse 91 has passed through the advance shift winding 51 on the second serial core 102, the condenser 18 discharges through the serial input coil 15 on the second serial core 102, setting that core to a P state of flux. The delay in transferring the serial output pulse from the first serial core 101 to the second serial core 102 is necessary to give the advance shift pulse 91, which is applied to all the advance shift windings, time to clear the second serial core 102 by setting it to an N state of flux.

By applying data input pulses 81 to 88 to the data input winding 11 on the first serial core 101 in alternate time relation with the application of advance shift pulses 91 to 97 to the advance shift windings 51, the entire signal train can be advanced through the serial cores 101 to 108 and stored therein in readiness for transfer to the parallel cores 201 to 208. Each binary one represented by a pulse in the signal train will now be represented by an N state of flux in one of the serial cores.

The next step in the operation of the shift register is to transfer the information stored in the serial cores 101 to 108 to the parallel cores 201 to 208 and to clear the serial cores 101 to 108 for the application thereto of a second signal train. The register is conditioned to perform this step by applying a blocking bias to the diode rectifiers 13 in the serial set of cores 101 to 108 and removing the blocking bias from the diode rectifiers 21 in the parallel set of cores 201 to 208. For this purpose a gating pulse 111 is applied to the first gating tube 31 and a cut-off pulse 112 to the second gating tube 41. The gating pulse 111 causes the first gating tube 31 to conduct producing a positive potential at the cathode side 35 of its time constant network 32. This positive potential is felt by all the diode rectifiers 13 associated with the serial set of cores 101 to 108 by raising the potentials on their cathodes to block conduction through them. The cut-off pulse 112 cuts off the second gating tube 41 causing a drop to zero of the potential at the cathode side 45 of its cathode time constant network 42. This drop in potential is felt by the diode rectifiers 21 associated with the parallel set of cores by lowering the potential on their cathodes to permit them to conduct.

Once the state of conduction of the gating tubes 31 and 41 has been changed as described above, actual transfer of information from the serial cores 101 to 108 to the parallel cores 201 to 208 is accomplished by the application of an advance shift pulse 98 to each of the advance shift windings 51 on the serial cores 101 to 108. This causes each serial core 101—108 having a P state of flux to change to an N state of flux inducing a signal in the output winding 12 of each serial core 101 to 108 which was in a P state of flux. Since the diode rectifiers 13 of the serial set of cores 101 to 108 are blocked and the diode rectifiers 21 of the parallel set unblocked, the signals so produced will be applied to the parallel input windings 22 on the parallel cores 201 to 208. In this way, parallel cores, associated with serial cores which had a P state of flux, will be set to P state of flux. At the same time all the serial cores will be reset to an N state. A necessary precaution to be taken in accomplishing this transfer of information is that the application of the advance shift pulse 98 to the advance shift windings 51 on the serial cores 101 to 108 be delayed from the beginning of the change in state of conduction of the gating tubes 31 and 41. This delay must at least equal the time required for discharge of the capacitors 34 and 44 in the time constant networks 32 and 42.

Once information has been transferred to the parallel set of cores 201 to 208, it is stored therein in readiness for producing a parallel pulse output to feed the utilization device 70. The parallel output is produced by applying to the output-advancing coils 61 on the parallel set of cores 201 to 208 an output shift pulse 113. Each parallel core previously set to a P state of flux will, upon application of the output shift pulse 113, change to an N state and product an output signal which is fed to the utilization device. Production of parallel output can occur at any time $t_2$ after the time $t_1$ at which information transfer to the parallel cores 201 to 208 took place. Since, during the time $t_0$ to $t_1$ that a serial input train 81 to 88 is advanced through the serial set of cores 101 to 108, the diode rectifiers 21 in the parallel set of cores 201 to 208 are biased off no interference can result between serial input and parallel output.

Obviously many modifications and variations of the present invention are possible in the light of the above teachings. It is therefore to be understood that within the scope of the appended claims the invention may be practiced otherwise than as specifically described.

What is claimed is:

1. An information shift register including $n$ number of serial arranged cores and an equal number of parallel arranged cores, said cores comprising magnetic material in which residual flux density is a substantial fraction of saturation flux density; an input winding, an output winding, and a shift winding, on each of said cores; a circuit connection associated with the input winding on the first core of said serial arranged cores for applying thereto an input signal train containing $n$ units of information; a circuit connection between a first source of shift pulses and the shift windings on said serial arranged cores; a circuit connection between a second source of shift pulses and the shift windings on said parallel arranged cores; output circuit connections for connecting the output windings on said parallel arranged cores to a utilization device; $n-1$ circuit connections one each between the output winding on each anterior core and the input winding on each posterior core of said serial arranged cores, each of said $n-1$ circuit connections including a diode rectifier in series relation with the connected windings; a first pulse delay network comprising a resistor, an inductor, and an input winding all shunted by a capacitor; $n$ circuit connections one each between the output winding on one of said serial arranged cores and an input winding on an associated one of said parallel arranged cores, each of said $n$ circuit connections including a diode rectifier in series relation with the connected windngs; a first source of blocking bias potential for said diode rectifiers in said $n-1$ circuit connections comprising an electron tube having at least an anode, a cathode, and a control electrode, and a time constant network comprising a parallel resistor-capacitor combination connected to said cathode, a connection between the cathode side of said time constant network and each of said pulse delay networks in said $n-1$ circuit connections for supplying blocking bias potential to the diode rectifiers therein; a second source of blocking bias potential for said diode rectifiers in said $n$ circuit connections comprising an electron tube havng at least an anode, a cathode, and a control electrode, and a time constant network comprising a parallel resistor-capacitor combination connected to said cathode, a connection from the cathode side of said time constant network to each of the diode rectifiers in said $n$ circuit connections for supplying blocking bias potential thereto; each of said parallel resistor-capacitor combinations having a long time constant relative to that of each of said pulse delay networks; and circuit connections associated with the control grids of said electron tubes for applying gating signals thereto to selectively bias said electron tubes to cut-off.

2. In a shift register including a plurality of magnetic cores of high magnetic remnance adapted to shift bits of information from one core to the next, an input winding on each core, an output winding on each core for driving the input winding on the next core, a coupling circuit between said output winding and the input winding on the next core, said coupling circuit comprising a forward lead and a return lead between said windings, a first rectifying means and impedance serially inserted in said forward lead, a temporary storage capacitance placed from the juncture of said first rectifying means and said impedance to said return lead, a low impedance selectively operable source of pulses having output connections interposed between the return lead side of said capacitance and said output winding, said source of pulses comprising a cathode follower circuit including a valve with a parallel resistor-capacitor combination connected to provide said output connections thereacross, said parallel resistor-capacitor combination having a long time constant relative to the length of said bits of information transmitted along said shift register, a plurality of output cores for coupling to corresponding cores of said shift register, each of said output cores having an input winding, second rectifying means in serial relation between the output winding on each shift register core and the input winding on the corresponding output core, and second pulse source means for biasing said second rectifying means, said second pulse source means comprising a cathode follower type valve with its output coupled to the input windings on said output cores.

3. In a shift register which includes a plurality of cascaded magnetic cores of high magnetic remnance adapted to shift bits of information from one core to the next, and including a coupling circuit between successive cores having unilateral impedance means, an improved switching circuit comprising a valve with a low-impedance output circuit, said output circuit having a long time constant relative to the length of bits of information shifted along said register, means to selectively render said valve inoperative, and means for coupling said output circuit to said coupling circuit.

References Cited in the file of this patent

UNITED STATES PATENTS

| | | |
|---|---|---|
| 2,652,501 | Wilson | Sept. 15, 1953 |
| 2,708,722 | Wang | May 17, 1955 |
| 2,763,851 | Haynes | Sept. 18, 1956 |
| 2,785,390 | Rajchman | Mar. 12, 1957 |
| 2,800,596 | Bolie | July 23, 1957 |
| 2,886,799 | Crooks | May 12, 1959 |